(12) United States Patent
Hosier et al.

(10) Patent No.: US 8,368,002 B2
(45) Date of Patent: Feb. 5, 2013

(54) IN-LINE IMAGE SENSOR IN COMBINATION WITH LINEAR VARIABLE FILTER BASED SPECTROPHOTOMETER

(75) Inventors: Paul A. Hosier, Rochester, NY (US); Jagdish C. Tandon, Fairport, NY (US); Josef E. Jedlicka, Denver, CO (US); Paul S. Bonino, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 521 days.

(21) Appl. No.: 12/580,028

(22) Filed: Oct. 15, 2009

(65) Prior Publication Data

US 2011/0089316 A1  Apr. 21, 2011

(51) Int. Cl.
 G01J 3/50 (2006.01)
 G01J 3/42 (2006.01)
(52) U.S. Cl. ........................ 250/226; 356/320
(58) Field of Classification Search .................. 250/226; 356/319, 320; 348/278
 See application file for complete search history.

(56) References Cited

U.S. PATENT DOCUMENTS

| | | | |
|---|---|---|---|
| 5,148,268 A | 9/1992 | Tandon et al. | |
| 5,159,199 A | 10/1992 | LaBaw | |
| 5,219,796 A | 6/1993 | Quinn et al. | |
| 5,373,374 A | 12/1994 | Traino et al. | |
| 5,550,653 A | 8/1996 | TeWinkle et al. | |
| 5,872,655 A | 2/1999 | Seddon et al. | |
| 6,057,925 A | 5/2000 | Anthon | |
| 6,266,438 B1 | 7/2001 | Metcalfe et al. | |
| 6,559,956 B2 * | 5/2003 | Proctor | 358/1.1 |
| 6,690,471 B2 | 2/2004 | Tandon et al. | |
| 6,844,930 B2 | 1/2005 | Kobayashi et al. | |
| 6,975,949 B2 | 12/2005 | Mestha et al. | |
| 7,271,380 B2 | 9/2007 | Banton et al. | |
| 7,333,208 B2 | 2/2008 | Mestha et al. | |
| 7,385,704 B2 | 6/2008 | Mestha et al. | |
| 7,592,608 B2 * | 9/2009 | Shakespeare et al. | 250/461.1 |
| 2008/0037069 A1 * | 2/2008 | Mestha et al. | 358/3.23 |
| 2008/0225309 A1 * | 9/2008 | Hosier | 358/1.9 |

* cited by examiner

*Primary Examiner* — Thanh Luu
(74) *Attorney, Agent, or Firm* — Simpson & Simpson, PLLC

(57) ABSTRACT

A photosensitive apparatus including a full width array of photosensors and a first photosensor chip. The first photosensor chip including a linear array of photosensors having a plurality of pixels arranged in a long direction and a linear variable filter adapted to transmit at least ten unique bandwidths of wavelengths of light along a length of the linear variable filter where the linear variable filter is fixedly secured to the linear array. Each respective pixel receives a unique bandwidth of wavelengths of light as a light passes through the linear variable filter and the length is aligned with the long direction. The full width array of photosensors is arranged perpendicular to a process direction of a printing device.

4 Claims, 3 Drawing Sheets

IN-LINE IMAGE SENSOR IN COMBINATION WITH LINEAR VARIABLE FILTER BASED SPECTROPHOTOMETER

INCORPORATION BY REFERENCE

The following co-pending application is incorporated herein by reference in its entirety: U.S. patent application Ser. No. 12/249,200, filed Oct. 10, 2008. The following patents are incorporated herein by reference in their entireties: U.S. Pat. Nos. 5,148,268; 5,373,374; 5,550,653; 6,266,438; 6,975,949; and, 7,271,380.

TECHNICAL FIELD

The presently disclosed embodiments are directed to in-line image sensors, such as linear variable filter based spectrophotometers and linear variable filter based spectrophotometers in combination with full width array sensors, used in a number of devices such as, for example, printing or duplicating devices.

BACKGROUND

Image sensor arrays typically comprise a linear array of photosensors which raster scan an image-bearing surface or document and convert the microscopic image areas viewed by each photosensor to image signal charges. Following an integration period, the image signal charges are amplified and transferred as an analog video signal to a common output line or bus through successively actuated multiplexing transistors.

For high-performance image sensor arrays, one possible design includes an array of photosensors of a width comparable to the width of a page being scanned, to permit one-to-one imaging generally without the use of reductive optics. In order to provide such a "full-width" array, however, relatively large silicon structures must be used to define the large number of photosensors. One technique to create such a large array is to make the array out of several butted silicon chips. In one design, an array includes 20 silicon chips, butted end-to-end, with each chip having active photosensors spaced at 400 or more photosensors per inch.

In most scanning systems currently in use, the signal coming out of the photosensors during the scanning process is an analog video signal, with the voltage magnitude corresponding to the intensity of light impinging on the photosensor at a given time. The different video levels correspond to the brightness of the reflected area being scanned by a particular photosensor at a particular moment. These analog outputs are digitized and then applied, as needed, to look-up tables, such as to convert the signals to a device-independent color space for further processing.

In a scanner for recording color images, there is typically provided multiple linear arrays or rows of photosensors. Each array/row includes a translucent filter, causing the particular linear array/row to be sensitive to substantially one primary color, such as red, blue, and green, to correspond to structures in the human eye. The signals from each filtered linear array/row are then recorded for assembling a full-color image. There may also be a "white," or effectively non-filtered, array/row. With a color input scanner, there is a need for occasional calibration of the linear array/row outputs relative to each other; to do this, the arrays/rows are typically exposed to white light from a test target of known properties, and their outputs are compared and generally normalized, such as through a look-up table for signal outputs. In a calibration operation, the look-up tables are typically altered depending on current conditions, to result in a normalized output when images are recorded.

U.S. Pat. No. 6,266,438 describes a basic color calibration system for a multi-chip input scanner, U.S. Pat. No. 5,373,374 describes an input scanner in which each of a set of primary-color filters are selectably placed in front of a single-linear-array photosensitive device, while U.S. Pat. No. 7,271,380 describes a calibration system for a photosensitive apparatus, such as a scanner, having a plurality of parallel linear-array photosensitive devices where each linear-array includes a primary color filter.

Although the above described calibration techniques are used with linear array systems, certain applications, such as high quality color printing on single marking engines or high quality color matching on dual marking engines, for example, Tightly Integrated Serial Printing (TSIP) or Tightly Integrated Parallel Printing (TIPP), require very precise absolute color detection and control, and preferably across the whole marking width and length. Single spot spectrophotometers have been used for inline or offline color fidelity control, usually in one process dimension or both directions with considerable effort, or alternatively with slow offline methods. For ease of use and integration, it is often desired to have a spectrophotometer inline with the print path, so that sheets, media or other image bearing surfaces are scanned automatically in real-time, with little or no user interaction. Full process sensors have been used to control relative color differences with some degree of accuracy, but these techniques are not able to control absolute color fidelity. Existing inline spectrophotometers (ILS) are relatively expensive and require extensive calibration techniques.

As can be derived from the variety of devices and methods directed at color printing quality control, many means have been contemplated to accomplish the desired end, i.e., consistent and reproducible color presentation within a single printing device as well as between a plurality of printing devices. Heretofore, tradeoffs between expense, accuracy, consistency and speed of measurement were required. Thus, the inventors have recognized that it would be desirable to provide an inline spectrophotometer which is cost effective to incorporate within a printing device that is capable of both controlling print quality within a single print device and between a plurality of print devices.

SUMMARY

In an embodiment, a photosensor chip including a linear array of photosensors having a plurality of pixels arranged in a long direction and a linear variable filter adapted to transmit at least ten unique bandwidths of wavelengths of light along a length of the linear variable filter where the linear variable filter is fixedly secured to the linear array. Each respective pixel receives a unique bandwidth of wavelengths of light as a light passes through the linear variable filter and the length is aligned with the long direction. The linear array of photosensors includes at least two linear arrays having a plurality of pixels, the at least two linear arrays are parallel and in registered alignment relative to each other to form a plurality of columns of pixels, and each respective column of pixels receives a unique bandwidth of wavelengths of light as a light passes through the linear variable filter, each of the plurality of columns of pixels includes a pixel from each of the plurality of pixels of the at least two linear arrays. Signal outputs from the pixels of each respective column of pixels are averaged to form an average column signal output.

In a further embodiment, a photosensitive apparatus including a full width array of photosensors and a first photosensor chip. The first photosensor chip including a linear array of photosensors having a plurality of pixels arranged in a long direction and a linear variable filter adapted to transmit at least ten unique bandwidths of wavelengths of light along a length of the linear variable filter where the linear variable filter is fixedly secured to the linear array. Each respective pixel receives a unique bandwidth of wavelengths of light as a light passes through the linear variable filter and the length is aligned with the long direction. The full width array of photosensors is arranged perpendicular to a process direction of a printing device.

In yet a further embodiment, a sensor module including a first photosensor chip having a linear array of photosensors including a plurality of pixels arranged in a long direction and a linear variable filter adapted to transmit at least ten unique bandwidths of wavelengths of light along a length of the linear variable filter where the linear variable filter is fixedly secured to the linear array. Each respective pixel receives a unique bandwidth of wavelengths of light as a light passes through the linear variable filter and the length is aligned with the long direction. This embodiment of a sensor module further includes a second photosensor chip having a linear array of photosensors including a plurality of pixels arranged in a long direction and a linear variable filter adapted to transmit at least ten unique bandwidths of wavelengths of light along a length of the linear variable filter where the linear variable filter is fixedly secured to the linear array. Each respective pixel receives a unique bandwidth of wavelengths of light as a light passes through the linear variable filter and the length is aligned with the long direction. In this embodiment of a sensor module, the first photosensor chip is arranged perpendicularly relative to the second photosensor chip.

In still yet a further embodiment, a method of calibrating a position and a linear spacing of a linear variable filter relative to a linear array of photosensors. The linear variable filter is fixedly secured to the linear array of photosensors and the linear array of photosensors includes a plurality of pixels. The method includes: aligning the linear variable filter with the linear array of photosensors; securing the linear variable filter to the linear array of photosensors; emitting a light beam from an illuminator at the linear variable filter, the light beam including a first narrow band spectral peak and a second narrow band spectral peak; determining a first pixel of the plurality of pixels corresponding to the first narrow band spectral peak; determining a second pixel of the plurality of pixels corresponding to the second narrow band spectral peak; and, calculating a calibration formula for the position and the linear spacing of the linear variable filter relative to the linear array of photosensors.

Other objects, features and advantages of one or more embodiments will be readily appreciable from the following detailed description and from the accompanying drawings and claims.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

At the outset, it should be appreciated that like drawing numbers on different drawing views identify identical, or functionally similar, structural elements of the embodiments set forth herein. Furthermore, it is understood that these embodiments are not limited to the particular methodology, materials and modifications described and as such may, of course, vary. It is also understood that the terminology used herein is for the purpose of describing particular aspects only, and is not intended to limit the scope of the disclosed embodiments, which are limited only by the appended claims.

Unless defined otherwise, all technical and scientific terms used herein have the same meaning as commonly understood to one of ordinary skill in the art to which these embodiments belong. As used herein, "image bearing surface" is intended to mean any surface or material capable of receiving an image or a portion of an image, e.g., a photoreceptor drum, a photoreceptor belt, an intermediate transfer belt, an intermediate transfer drum, an imaging drum, or a document. Furthermore, as used herein, "average" and/or "averaging" should be construed broadly to include any algorithm or statistical process having as inputs a plurality of signal outputs, for any purpose. Although any methods, devices or materials similar or equivalent to those described herein can be used in the practice or testing of these embodiments, some embodiments of methods, devices, and materials are now described.

U.S. Pat. No. 5,148,268, mentioned above, discloses a full width array apparatus used for the scanning and imaging of an image bearing surface. Such sensor chips are capable of measuring: streaking, i.e., undesired, narrow streaks of ink, toner or other colorants that extend along the process direction of the print sheet or image receptor (photoreceptor, intermediate belt or drum, etc.); and, banding, i.e., the presence of areas of bands of undesired anomalies (too dark, too light, wrong colors) in image quality, the bands extending in a direction perpendicular to the process direction of the print sheet or image receptor. Additionally, these sensor chips are capable of detecting how much toner is present on an image bearing surface and where such toner is present. Although the foregoing sensor chips include red, green, blue and monochrome, they are incapable of accurate analysis of absolute spectral data.

At the outset, it should be appreciated that image printing systems generally have two important dimensions: a process (or slow scan) direction and a cross-process (or fast scan) direction. The direction in which the image bearing surface moves is referred to as the process direction, and the direction in which the plurality of sensors are oriented is referred to as the cross-process direction. The cross-process direction is generally perpendicular to the process direction.

Figure 1:
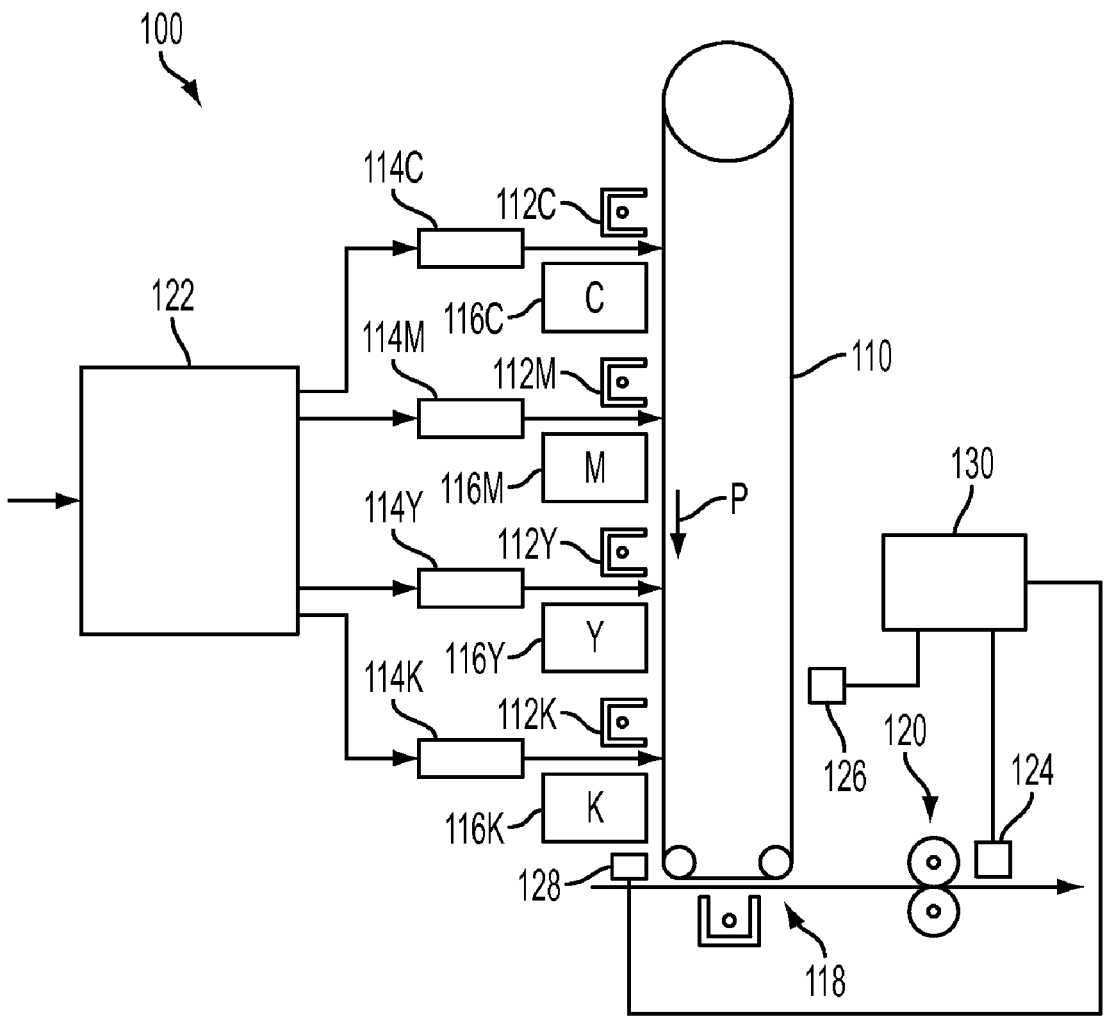
FIG. 1 is a simplified elevational view of basic elements of a xerographic color printer, showing a context of the various embodiments.

FIG. 1 is a simplified elevational view of basic elements of an image printing system, showing a context of the present disclosure. Specifically, there is shown an "image-on-image" xerographic color printer, in which successive primary-color images are accumulated on an image bearing surface, e.g., photoreceptor belt, and the accumulated superimposed images are in one step directly transferred to an output sheet as a full-color image. It should be appreciated that any image printing system, such as color or monochrome machines using any technology, machines which print on photosensitive substrates, xerographic machines with multiple photoreceptors, or ink-jet-based machines, can beneficially utilize the present disclosure as well.

Specifically, the FIG. 1 embodiment of image printing system 100 includes image bearing surface 110, e.g., belt photoreceptor, along which are disposed a series of stations, as is generally familiar in the art of xerography, one set for each primary color to be printed. For instance, to place a cyan color separation image on image bearing surface 110, there is used charge corotron 112C, an imaging laser 114C and development unit 116C. For successive color separations, there is provided equivalent elements 112M, 114M, 116M (for magenta), 112Y, 114Y, 116Y (for yellow), and 112K, 114K, 116K (for black). The successive color separations are built up in a superimposed manner on the surface of image bearing surface 110, and then the combined full-color image is transferred at transfer station 118 to an output sheet. The output sheet is then run through fuser 120, as is familiar in xerography. Printing process may be controlled, for example, by print controller 122.

As is familiar in the art of "laser printing," by coordinating the modulation of the various lasers with the motion of image bearing surface 110 and other hardware (such as rotating mirrors, etc., not shown), the lasers discharge areas on image bearing surface 110 to create the desired printing, particularly after these areas are developed by their respective development units 116C, 116M, 116Y and 116K.

In one embodiment, a photosensitive apparatus of the present disclosure may be placed in the image printing system to directly monitor printed images as they exit the device, for example, at location 124. In another embodiment, a photosensitive apparatus of the present disclosure can be placed just before or just after transfer station 118 where the toner is transferred to the sheet or media, for example, at locations 126 and/or 128 for monitoring images directly on the image bearing surface or other intermediate transfer members. A photosensitive apparatus of the present disclosure can make measurements of toner images created on image bearing surface 110 (such as sensing devices 126 and 128) or of printed images which were transferred to an output sheet (such as sensing device 124). There may be provided any number of sensing devices placed anywhere in the printer as needed, not only in the locations illustrated.

Sensing devices 124, 126 and 128 provide feedback to control device 130 for taking action in response to critical measurements taken. The information gathered therefrom is used by control device 130 and/or print controller 122 in various ways to aid in the operation of the printer, whether in a real-time feedback loop, an offline calibration process, a registration system, etc. While control device 130 is shown in the figure as being a separate element, it will be appreciated that in some implementations, control device 130 may be a part of print controller 122. Thus, the present embodiments may be located in the paper path, may determine and control absolute color, and may monitor for defects, for example, on the photoreceptor belt or on the paper (e.g., fusing errors) including errors present on the full length and width of a page.

Figure 2:
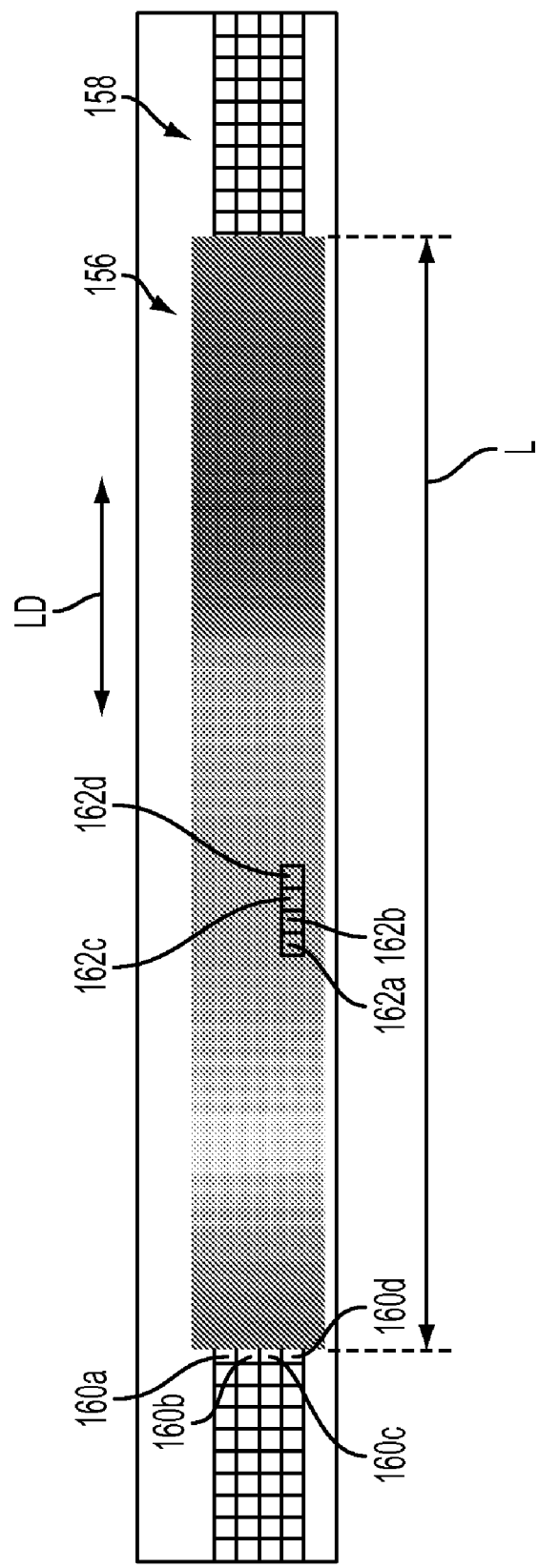
FIG. 2 is a top plan view of an embodiment of a photosensor chip for providing color analysis of an image on an image bearing surface including a linear variable filter positioned over a plurality of linear arrays of photosensors.

FIG. 2 shows a top plan view of an embodiment of a photosensor chip for providing color analysis of an image on an image bearing surface including a linear variable filter positioned over a plurality of linear arrays of photosensors. This embodiment of a photosensor chip includes linear sensor 158 which includes four linear arrays of photosensors, i.e., the arrays or rows which each include pixels 160a, 160b, 160c and 160d. Although in this embodiment, four linear arrays are depicted, it should be appreciated that other arrangements are also possible, e.g., one linear array, two linear arrays, etc., and such variations are within the spirit and scope of the claims. Each array of photosensors is arranged in a long direction depicted by bi-directional arrow LD. Moreover, the embodiment shown in FIG. 2 includes linear variable filter 156 fixedly secured to linear sensor 158. Linear variable filter 156 is an optical narrow bandpass coated glass filter. In one embodiment, the center wavelength of the bandpass varies linearly from one end of the linear variable filter to the other. In another embodiment, the center wavelength of the bandpass varies in a logarithmic fashion along the length of the linear variable filter. In one embodiment, the linear variable filter comprises three different layers, a bandpass coating, a substrate and a blocker coating, through which the light reflecting off the image bearing surface is configured to pass therethrough. In one embodiment, the linear variable filter achieves its spectral performance with a film, e.g., a bandpass coating, that varies in thickness across its face. It should be appreciated that typical linear variable filters are capable of transmitting at least ten or more unique bandwidths of wavelengths of light across their full lengths. The nature and mode of operation of linear variable filters are well known and are therefore not discussed in detail herein.

As can be seen in FIG. 2, the four linear arrays are parallel and in registered alignment relative to each other. In other words, pixels 160a, 160b, 160c and 160d are aligned so that a column of pixels is formed, and each column that is formed includes the same number of pixels as the number of linear arrays. For example, in FIG. 2, there are four linear arrays and each column has four pixels. As linear variable filter 156 permits specific bandwidths of wavelengths to pass therethrough, depending upon where along the length of filter 156 the light passes, each respective column receives a specific bandwidth of wavelengths of light depending upon the column's position relative to the linear variable filter. Moreover, as a photo site or column of pixels corresponds to a particular spectral content, signal-to-noise ratio is improved by averaging the entire photo site or column of pixels. In other words, averaging pixels 160a . . . 160d results in a better signal-to-noise ratio than merely taking a reading of only pixel 160a. It should be appreciated that the signal-to-noise ratio of reading only pixel 160a may be acceptable for some applications, and such applications can occur more quickly due to the decrease in the total number of pixels read. Additionally, averaging of pixels may occur in the cross-process direction whereby a particular bandwidth of spectra may be viewed. For example, pixels 162a . . . 162d may be averaged thereby resulting in spectral width or bandwidth four times the spectral width of a single pixel. By controlling the number of averaged pixels, the spectral width of the measured area may be controlled and such averaging reduces the signal-to-noise ratio. Additionally, linear variable filter 156 may be a different length, i.e., the length depicted by bi-directional arrow L, than linear sensor 158. For example, linear variable filter 156 may be shorter than linear sensor 158.

Figure 3:
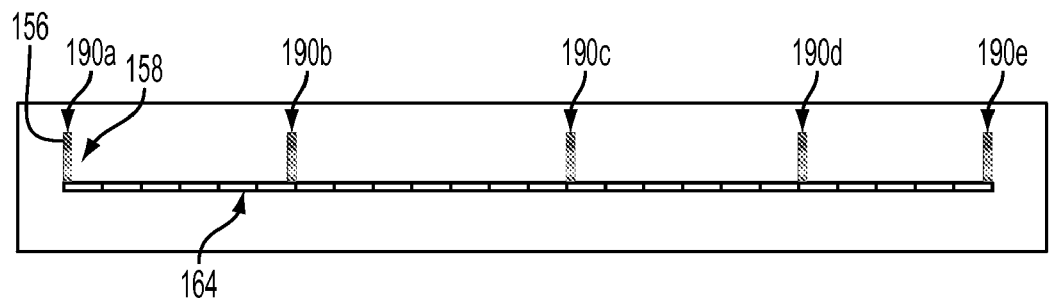
FIG. 3 is a top plan view of an embodiment of a photosensitive apparatus for providing color analysis of an image on an image bearing surface having a full width array perpendicular relative to a plurality of linear variable filter/linear sensor combinations; and, FIG. 4 is a top plan view of an embodiment of a photosensitive apparatus for providing color analysis of an image on an image bearing surface having a full width array parallel relative to a plurality of linear variable filter/linear sensor combinations and simultaneously perpendicular relative to a plurality of linear variable filter/linear sensor combinations.

FIG. 3 shows a top plan view of an embodiment of a photosensitive apparatus for providing color analysis of an image on an image bearing surface having a full width array perpendicular relative to a plurality of linear variable filter/linear sensor combinations. In this embodiment, each respective photosensor chip, i.e., the combination of linear variable filter 156 and linear sensor 158, are positioned perpendicular relative to full width array 164. It should be appreciated that in the embodiments discussed herein, the full width array may be arranged similarly as the full width array taught in U.S. Pat. No. 5,148,268, and therefore may include rows or arrays of pixels sensitive to different colors, e.g., red, green, blue and monochrome. The photosensitive apparatus may include one or more photosensor chip adjacent to full width array 164 and such photosensor chips may be positioned at a plurality of locations along full width array 164, e.g., positions 190a . . . 190e.

Figure 4:
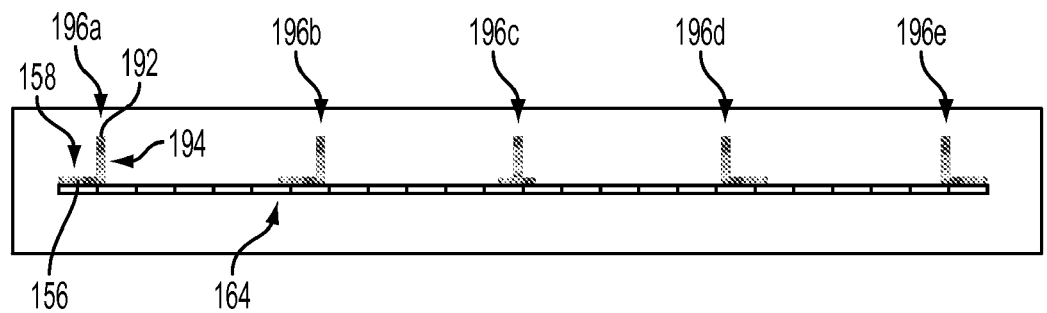

FIG. 4 shows a top plan view of an embodiment of a photosensitive apparatus for providing color analysis of an image on an image bearing surface having a full width array parallel relative to a plurality of linear variable filter/linear sensor combinations and simultaneously perpendicular relative to a plurality of linear variable filter/linear sensor combinations. In this embodiment, photosensor chips, i.e., the combinations of linear variable filter 156 and linear sensor 158 and the combinations of linear variable filter 192 and linear sensor 194, are positioned both parallel and perpendicular relative to full width array 164. As with the embodiments described above, the photosensitive apparatus may include one or more photosensor chip adjacent to full width array 164 and such photosensor chips may be positioned at a plurality of locations along full width array 164, e.g., positions 196a . . . 196e. Moreover, the positions of each photosensor chip relative to its adjacent photosensor chip may be different. For example, at positions 196a and 196b, the perpendicular photosensor chips are positioned approximately at the right edge of the parallel photosensor chips, at position 196c, the perpendicular photosensor chip is positioned approximately at the center of the parallel photosensor chip, while at positions 196d and 196e, the perpendicular photosensor chips are positioned approximately at the left edge of the parallel photosensor chips. Even yet further, embodiments may include only the combinations of linear variable filter 156 and linear sensor 158 or the combinations of linear variable filter 192 and linear sensor 194, and such embodiments are within the spirit and scope of the claims.

As shown in FIGS. 3 and 4, it can be seen that the present embodiments may include positioning linear variable filter/linear sensor combination at a plurality of locations across the full width array. Thus, color correction/monitoring may occur in the center of the page, at the edges of the image bearing surface and/or across the entire cross-process direction of the image bearing surface. Furthermore, the electronics which drive and read linear sensors 158, 164 and 194 may be arranged in parallel or in series. Different benefits are obtained by the different arrangements, for example, a parallel arrangement may result in faster read times, while a series arrangement may facilitate easier drop-in replacement of an existing full width array assembly with an embodiment of a full width array in combination with the present embodiments of an in-line spectrophotometer.

It should be appreciated that when the first and second linear sensors are parallel with respect to each other, the apparatus can monitor printing performance in real-time by observing the spectral content of either a portion of an image or the entire image in the cross-process direction. Thus, in these embodiments, the apparatus does not require test patterns in the inter-document zones in order to monitor and control the printing performance. Furthermore, when the first and second linear sensors are perpendicular with respect to each other, test patterns in the inter-document zones are necessary. In such embodiments, the apparatus can monitor printing performance in real-time as the same portion of a test pattern moves over the entire spectral window of the linear variable filter so that the apparatus may obtain a full spectrum measurement of the test pattern in the cross-process direction thereby resulting in pure color measurement. It should be appreciated that in these embodiments, it is assumed that each test pattern is uniform in the cross-process direction and that a test pattern is required to correspond to each respective linear variable filter/linear sensor combination, e.g., linear variable filter/linear sensor combinations 190a . . . 190e.

The foregoing linear sensors may comprise the full width array sensors described supra. Such sensors are configured to detect any desired part of the printed image, while printing real images. A full width array sensor may include a plurality of sensors equally spaced at intervals, e.g., every 1/600th inch (600 spots per inch) in the cross-process direction. Although some of the described embodiments extend substantially the full width of a sheet path or of any image bearing member, such as a photoreceptor or intermediate belt or drum, as used herein, the term "full width array" can apply to any array of photosensors that extends a significant linear distance, or in other words, extending any portion of the width of the sheet path or image bearing member. It should be understood that other linear array sensors may also be used, such as contact image sensors, CMOS array sensors or CCD array sensors. Furthermore, the present embodiments may use a sensor chip, which is significantly smaller than the width of the image bearing surface. The sensor chip is configured to detect only a portion of the image bearing surface or printed image, and not the entire width of the image bearing surface or printed image.

It should be appreciated that the positioning of the linear variable filter relative to the linear sensor as well as the linear spacing within the linear variable filter introduces variability to the accuracy and precision of the present embodiments. In other words, manufacturing tolerances in the securing of the linear variable filter to the linear sensor will introduce variability in the absolute position of a particular wavelength on the linear sensor. Additionally, manufacturing tolerances in the production of the linear variable filter create variability in the linear spacing of the linear variable filter, i.e., the change in wavelength per unit length of filter material.

Thus, an embodiment includes a method of calibrating the position and linear spacing of the linear variable filter relative to the linear sensor. The method comprises first aligning the linear variable filter with the linear sensor and then securing the linear variable filter to the linear sensor. Next, an illuminator emits a light beam comprising a first narrow band spectral peak and a second narrow band spectral peak. Then, a first pixel of the plurality of pixels, of the linear sensor, corresponding to the first narrow band spectral peak is determined, and a second pixel of the plurality of pixels, of the linear sensor, corresponding to the second narrow band spectral peak is determined. Last, a calibration formula for the position and the linear spacing of the linear variable filter relative to the linear sensor is calculated.

In some embodiments, the first and second narrow band spectral peaks are emitted from a single illumination source, while in other embodiments, the first and second narrow band spectral peaks are emitted from different illumination sources. For example, a mercury vapor lamp produces narrow band spectral peaks corresponding to about 436 nanometers and about 578 nanometers. In this arrangement, a single illuminator may be used to determine the specific pixel corresponding to a specific wavelength, i.e., 436 or 578 nanometers, and the linear spacing of the linear variable filter may be calculated by determining the distance between the specific pixels corresponding to each of the narrow band spectral peaks. Alternatively, separate illumination sources may be used to produce the first and second narrow band spectral peaks, e.g., a mercury vapor lamp and a sodium vapor lamp. In this embodiment, a first narrow band spectral peak of about 436 nanometers is provided by the mercury vapor lamp and a second narrow band spectral peak of about 589 nanometers is provided by the sodium vapor lamp.

The calibration formula may take a number of forms, e.g., a linear relationship between the wavelengths of the narrow band spectral peaks and their corresponding pixels or, if more than two wavelengths of light are used, a quadratic, polynomial, logarithmic or other relationship may be determined. For example, the calibration formula may comprise:

$$\lambda(n) = \lambda_2 - \frac{\lambda_2 - \lambda_1}{pixel_1 - pixel_2} \times (n - pixel_2). \quad (1)$$

In this embodiment, the wavelength of a particular pixel, i.e., $\lambda(n)$, may be calculated based on the wavelengths of the first and second narrow band spectral peaks, i.e., $\lambda_1$ and $\lambda_2$, respectively, and their respective corresponding pixels, i.e., $pixel_1$ and $pixel_2$, respectively. Thus, for an particular pixel n, the wavelength corresponding to that pixel may be calculated.

Such calibration procedures may be performed off-line or within a printing system. The results of such calibration procedures may be stored within the present embodiment apparatus, e.g., within non-volatile random access memory (NVRAM) or may be stored within a printing system.

A further embodiment of a calibration procedure includes performing a calibration of a linear sensor having photosensors comprising a plurality of pixels, each pixel including a plurality of photosensors, each photosensor sensitive to a unique color. Each pixel may respond differently, thereby requiring unique calibrations for each photosensor, e.g., each pixel having a calibration value for each red, green, blue and monochrome photosensor. Thus, when the present embodiments of a first linear sensor positioned adjacent to a second linear sensor having a linear variable filter secured thereon scans a test pattern, the spectral measurements determined by the second linear sensor may be used to create calibration values for each respective photosensor thereby allowing for subsequent absolute color control by the first linear sensor only. A calibration procedure for a linear sensor is set forth in U.S. Pat. No. 7,271,380, which patent is incorporated herein by reference.

In addition to the foregoing calibration procedure, additional system calibration may also occur. For example, during system cycle up, the entire image bearing surface may be scanned to obtain a baseline reading of an empty surface. Additionally, the linear sensors may be calibrated with the illumination source(s) off, with the illumination source(s) on and no toner on the image bearing surface, with the illumination source(s) on and 10% halftone toner on the image bearing surface, with the illumination source(s) on and 20% halftone toner on the image bearing surface, etc. For all the aforementioned calibration techniques, a calibration curve may be determined for the entire system, or alternatively, a separate calibration curve for each individual pixel may be determined. Moreover, during normal use, further calibration may occur by scanning calibration targets disposed in inter-document zones, i.e., the areas on the image bearing surface between individual images.

The present disclosure, thus, provides a sensing system that simultaneously images an image or image bearing surface onto a linear sensor assembly and the linear variable filter/linear sensor assembly combination, where the pixel output of the sensing system will correspond to the image or image bearing surface (linear sensor assembly) and the relative spectral reflectivity of the image or the image bearing surface (linear variable filter/linear sensor assembly combination), which can then be used to determine and influence the color performance of the image printing system in real-time. In other words, the present embodiments provide an apparatus and a method for measuring the exact spectral content of an image or an image bearing surface. The concept discussed in the present disclosure may be used for both spot measurement as well as full page width spatially resolved spectral imaging. The linear variable filter/linear sensor assembly combination provides a low cost spectrophotometer for in-line color output print measurement. One of the advantages of the present disclosure is to provide a spectrophotometer for in-line color output print measurement, the spectrophotometer having a much lower cost compared to other alternatives of inline spectrophotometers. Furthermore, another advantage of the present disclosure is to provide a spectrophotometer that utilizes an image printing system's existing electronics, illumination and optics, thereby creating a drop-in replacement for existing full width arrays, or other sensor chips It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What we claim is:

1. A photosensitive apparatus comprising:
a full width array of photosensors; and,
a first photosensor chip comprising:
   a linear array of photosensors comprising a plurality of pixels arranged in a long direction; and,
   a linear variable filter adapted to transmit at least ten unique bandwidths of wavelengths of light along a length of said linear variable filter, said linear variable filter fixedly secured to said linear array,
   wherein each respective pixel receives a unique bandwidth of wavelengths of light as a light passes through said linear variable filter and said length is aligned with said long direction,
a second photosensor chip comprising:
   a linear array of photosensors comprising a plurality of pixels arranged in a long direction; and,
   a linear variable filter adapted to transmit at least ten unique bandwidths of wavelengths of light along a length of said linear variable filter, said linear variable filter fixedly secured to said linear array,
   wherein each respective pixel receives a unique bandwidth of wavelengths of light as a light passes through said linear variable filter and said length is aligned with said long direction,
wherein said full width array of photosensors is arranged perpendicular to a process direction of a printing device,
wherein said first photosensor chip is arranged perpendicular relative to said full width array.

2. The photosensitive apparatus according to claim 1 wherein said first and second photosensor chips are arranged perpendicular relative to said full width array.

3. The photosensitive apparatus according to claim 1 wherein said second photosensor chip is arranged parallel relative to said full width array.

4. A sensor module comprising:
a first photosensor chip comprising:
   a linear array of photosensors comprising a plurality of pixels arranged in a long direction; and,
   a linear variable filter adapted to transmit at least ten unique bandwidths of wavelengths of light along a length of said linear variable filter, said linear variable filter fixedly secured to said linear array,
   wherein each respective pixel receives a unique bandwidth of wavelengths of light as a light passes through said linear variable filter and said length is aligned with said long direction; and,
a second photosensor chip comprising:
   a linear array of photosensors comprising a plurality of pixels arranged in a long direction; and,
   a linear variable filter adapted to transmit at least ten unique bandwidths of wavelengths of light along a length of said linear variable filter, said linear variable filter fixedly secured to said linear array,
   wherein each respective pixel receives a unique bandwidth of wavelengths of light as a light passes through said linear variable filter and said length is aligned with said long direction,
wherein said first photosensor chip is arranged perpendicularly relative to said second photosensor chip.

* * * * *